United States Patent [19]

Houser

[11] Patent Number: 5,080,805
[45] Date of Patent: Jan. 14, 1992

[54] METHOD AND APPARATUS FOR REMOVING IRON FROM WELL WATER

[75] Inventor: Stan Houser, 288 Mill Road, Suite E-45, Etobicoke, Ontario M9C 4X7, Canada

[73] Assignees: Helen Houser; Stan Houser, both of Etobicoke, Canada; a part interest

[21] Appl. No.: 256,307

[22] Filed: Oct. 11, 1988

[30] Foreign Application Priority Data

May 4, 1988 [CA] Canada .................. 565622

[51] Int. Cl.⁵ .................................. C02F 1/74
[52] U.S. Cl. .................. 210/722; 210/724; 210/747; 210/758; 210/170; 210/206; 210/220; 166/230; 166/310; 166/311; 166/371
[58] Field of Search ........ 210/721, 722, 724, 747, 210/758, 170, 220, 499, 242.2, 916, 206, 207, 209; 166/105.1, 230, 310, 311, 371, 902

[56] References Cited

U.S. PATENT DOCUMENTS

| 3,171,800 | 3/1965 | Rice | 210/52 |
|---|---|---|---|
| 3,649,532 | 3/1972 | McLean | 210/722 |
| 3,649,533 | 3/1972 | Reijonen | 210/50 |
| 4,419,232 | 12/1983 | Arntyr | 210/16 |
| 4,430,228 | 2/1984 | Paterson | 210/665 |
| 4,478,765 | 10/1984 | Tubbs | 210/170 |
| 4,526,692 | 7/1985 | Yohe et al. | 210/747 |
| 4,534,867 | 8/1985 | Kreusch et al. | 210/722 |
| 4,543,186 | 9/1985 | Weisenbarger et al. | 210/221 |
| 4,572,797 | 2/1986 | Silver | 252/631 |
| 4,582,610 | 4/1986 | Baker | 210/747 |
| 4,624,791 | 11/1986 | Ferriss | 210/704 |
| 4,696,802 | 9/1987 | Bedell | 210/747 |
| 4,780,215 | 10/1988 | Carlson | 210/722 |

FOREIGN PATENT DOCUMENTS 621880 8/1934 Fed. Rep. of Germany.

Primary Examiner—Stanley S. Silverman
Assistant Examiner—Christopher Upton
Attorney, Agent, or Firm—Krass & Young

[57] ABSTRACT

A method of removing iron from ground water located in a water well and of preventing production of hydrogen sulphide in such water including positioning a bubbling device in the well below the waterline. This device, which is connected to a source of pressurized air, is operated to produce a continuous flow of air bubbles in the water to render dissolved iron in the water insoluble so that the latter precipitates out and the well water aerobic. The insoluble iron can then be gathered from the well periodically. In one version, an iron collecting device in the form of a bag is placed around the bubbling device. The bag is removable from the well in order to remove and dispose of collected insoluble iron. Calcium carbonate can be used to adjust the pH level to pH 7. When the bubbling device is introduced into water containing sulphur, the air stream of bubbles has a double action and prevents hydrogen sulphide production.

18 Claims, 3 Drawing Sheets

METHOD AND APPARATUS FOR REMOVING IRON FROM WELL WATER

BACKGROUND OF THE INVENTION

This invention relates to a method of removing iron from ground water located in a water well and of preventing production of hydrogen sulphide. An apparatus for carrying out the method is also disclosed.

All underground water contains minerals and other substances which are soluble in water. Often a problem with water which flows from, or which is pumped from wells in the ground, is to remove undesirable elements which are in solution. One common undesirable element is iron and compounds containing iron. Iron compounds can produce severe discolouration which is often observed on fixtures such as sinks, bathtubs and in the water tanks on toilets. Such iron exists in a variety of forms in water including dissolved, suspended and colloidal. Usually the form of iron will shift from particulate form to colloidal form to soluble form.

When an undesirable compound is dissolved, it cannot be reduced or removed by a filtration process, leaving two possible methods for removing such a compound. A common method, especially in large water systems such as municipal water systems, is by chemical treatment in combination with filtration. A second method is by a combination of aeration and filtration. The object of the latter method is to convert the undesirable compound, which is in unfiltrable solution into either precipitates or colloids which may be removed by subsequent filtration.

U.S. Pat. No. 4,543,186 issued Sept. 24, 1985, to Weisenbarger et al teaches an apparatus and method for the treatment of well water. In this method, aeration of the water takes place in the well above the waterline. The apparatus includes an aerator assembly which has a vertical venturi tube and a magnetic unit having at least two elongated permanent bar magnets. A bi-pass tube passes between the bar magnets and connects the upstream end of the venturi tube to the water in the discharge side of the pump. A small portion of the pumped water is polarized and aerated and then this treated water is returned to the raw water in the well.

U.S. Pat. No. 4,582,610 issued Apr. 15, 1986, to M. Baker describes a water well aeration system adapted to remove volatile contaminents from well water pumped through the well pipe of a well into a building. An elongate spray conduit is placed into the well pipe at a location below the top of the well and above the water level. This conduit has spray holes for spraying, aerating and recirculating a portion of the well water pumped through the well pipe with the fractional portion falling back down the well. The spray holes are selected in number and diameter to maintain adequate pressure for continued pumping of the well water through the well pipe.

It is an object of the present invention to provide a unique and simple method of removing iron from ground water and/or preventing the production of hydrogen sulphide in such water before the water is pumped from a water well. It is advantageous to remove iron from the water at the first opportunity and before it leaves the well since this will prevent the iron from precipitating out in pipes and appliances located above the ground and eventually causing damage to these pipes and appliances.

SUMMARY OF THE INVENTION

According to one aspect of the present invention, a method of removing iron from ground water located in a water well comprises positioning a bubbling device in the well below the waterline. This device, which is connected to a source of pressurized air, is then operated to produce a continuous flow of air bubbles in the water in order to render dissolved iron in the water insoluble. The latter precipitates out and can then be gathered from the well periodically.

In one preferred form of this method, an iron collecting device is positioned around the bubbling device and is removable from the well in order to remove and dispose of collected insoluble iron precipitate.

According to a further aspect of the invention, a method of improving ground water located in a water well comprises positioning a bubbling device in said well below the waterline, said device being connected to a source of pressurized air, and operating said bubbling device to produce a continuous flow of air bubbles in the water wherein either dissolved iron in the water is rendered insoluable so that the latter precipitates out or the production of hydrogen sulphide due to the presence of one or more sulphur containing compound is prevented.

According to another aspect of the invention, an apparatus for removing iron from ground water located in a water well comprises a bubbling device adapted for placement in the water well. There is also provided line means for connecting the bubbling device to a source of pressurized air. An iron collecting device is adapted to be mounted around the bubbling device in the water well.

In one preferred version of this iron removing apparatus, a lump of calcium carbonate is located in the bubbling device so as to contact water passing through this device. If required, the calcium carbonate will raise the pH level to pH 7.

The bubbling device described herein is highly advantageous in a well having water with sulphur containing compounds. If a well contains both such compounds and dissolved iron, the air stream produced by the bubbler will have a double action.

One big advantage of the present method and apparatus is the cost of the equipment and maintainence thereof. Current commercially available systems for removing iron can cost hundreds of dollars while the present system can sell for less than one hundred Canadian dollars.

Further features and advantages will become apparent from the following detailed description when taken in conjunction with the drawings.

DETAILED DESCRIPTION OF PREFERRED EMBODIMENTS

Figure 1:
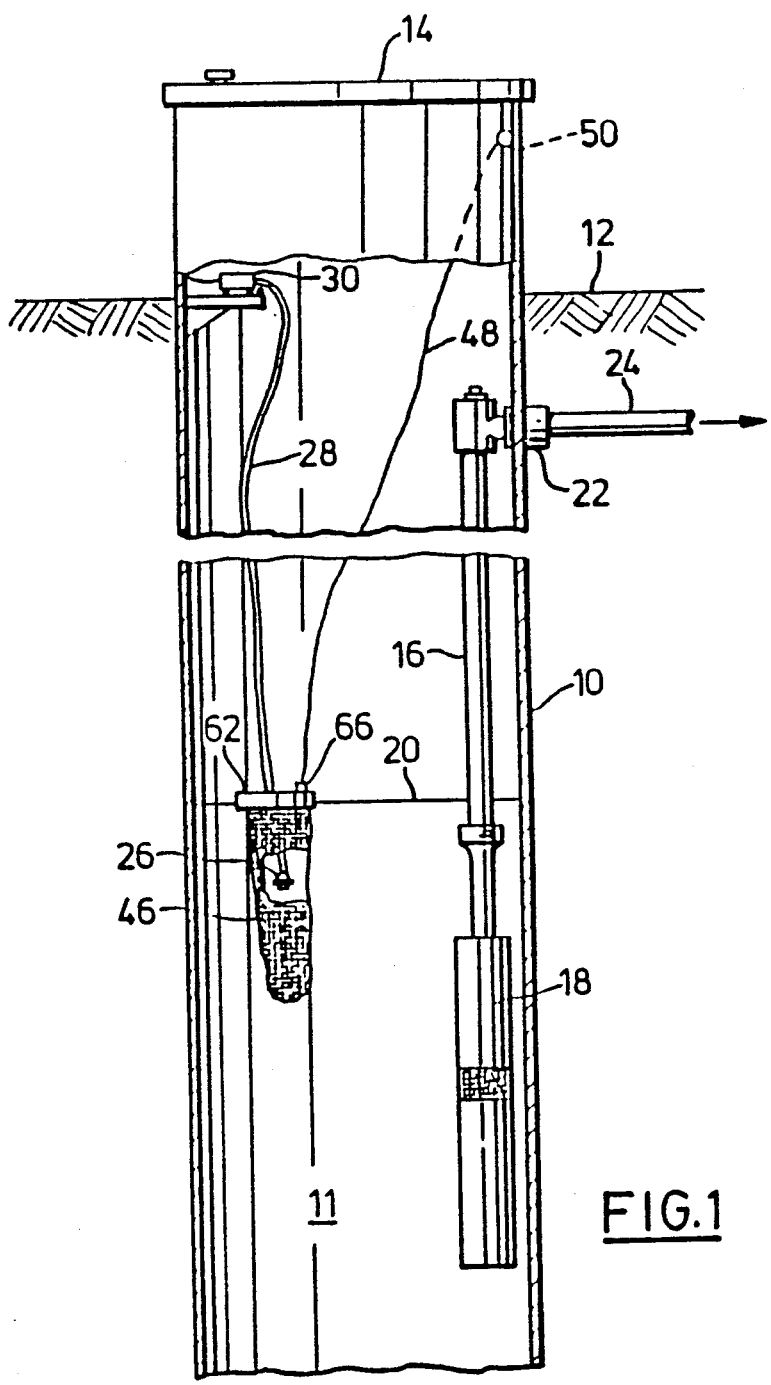
FIG. 1 is a schematic illustration in cross-section, with portions broken away for illustration, of an apparatus constructed in accordance with the invention installed in a well using a submersible pump.
Figure 4:
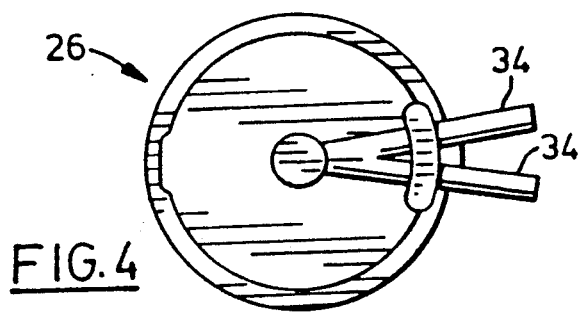
FIG. 4 is a bottom view of the bubbler of FIG. 3.

The types of water wells vary from one location to another, the exact form of the well depending upon the height of the water table and other local conditions. In FIG. 1 there is illustrated a deep well installation having a casing 10 whose lower end extends into the well water 11. The upper end of the casing extends above ground level located at 12. A suitable cover 14 is positioned on top of the well. Extending vertically in the well is a water pipe 16 to which is connected a conventional submersible pump 18 located below the waterline 20. The casing is provided with an adaptor 22 mounted in an aperture and this adaptor is well known in the well industry. It will be understood that the pump 18 can be electrically energized to pump water through the pipe 16 and then through horizontal pipe 24 to a water system such as that used in a house.

Figure 3:
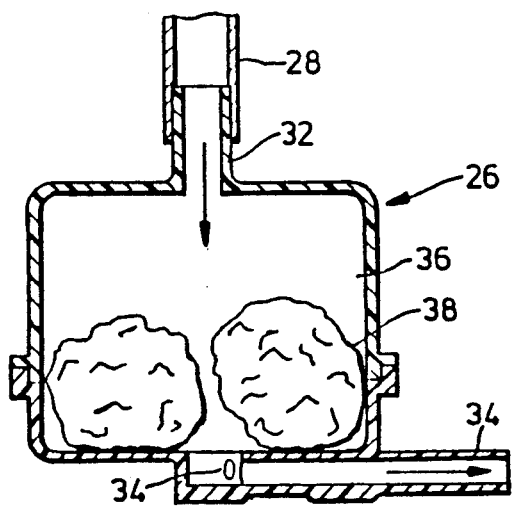
FIG. 3 is a cross-sectional view of a bubbler that can be used in the method and apparatus of the invention.

In order to remove iron contaminants from the well water 11, the method of the invention employs a bubbling device 26 which is located in the well. This bubbling device can take various forms with one preferred embodiment being illustrated in cross-section in FIG. 3. Line means in the form of tubing 28 connect the bubbling device 26 to a source of pressurized air, such as air pump 30 which can be electrically operated. The air pump 30 can be quite small in size and need not be expensive. At least for smaller domestic wells a pump as small as an aquarium air pump is sufficient. Such pumps are available at a very low cost. A standard air pump of this type runs on 115 volt standard electric supply. The tubing 28 can be of standard plastic construction such as that sold under the trade name TYGON. The preferred depth for the bubbler 26 in the well is at least one meter. It should not be so deep that it will not work because the small air pump cannot overcome the pressure of the water.

The air bubbler 26 can be of various forms, some of which are known for aquarium use. The bubbler illustrated in FIG. 3 has an inlet 32 to which the tubing 28 is connected and two outlets 34 from which the air flows to create the desired bubbles. The device 26 has an enclosed chamber 36 which contains a piece or pieces of crushed calcium carbonate 38. Water passing through the bubbler is brought into contact with the calcium carbonate and the effect of this material is to raise the pH level to pH 7 if required. The water in the well might have a low pH due to surrounding soil conditions, the effects of acid rain or due to oxidation of anion portions of the original iron compounds. The crushed calcium carbonate will dissolve slowly while raising the pH level. At a pH of 7 or higher, calcium carbonate is practically insoluble so it will not effect the overall chemistry of the well water.

Figure 6:
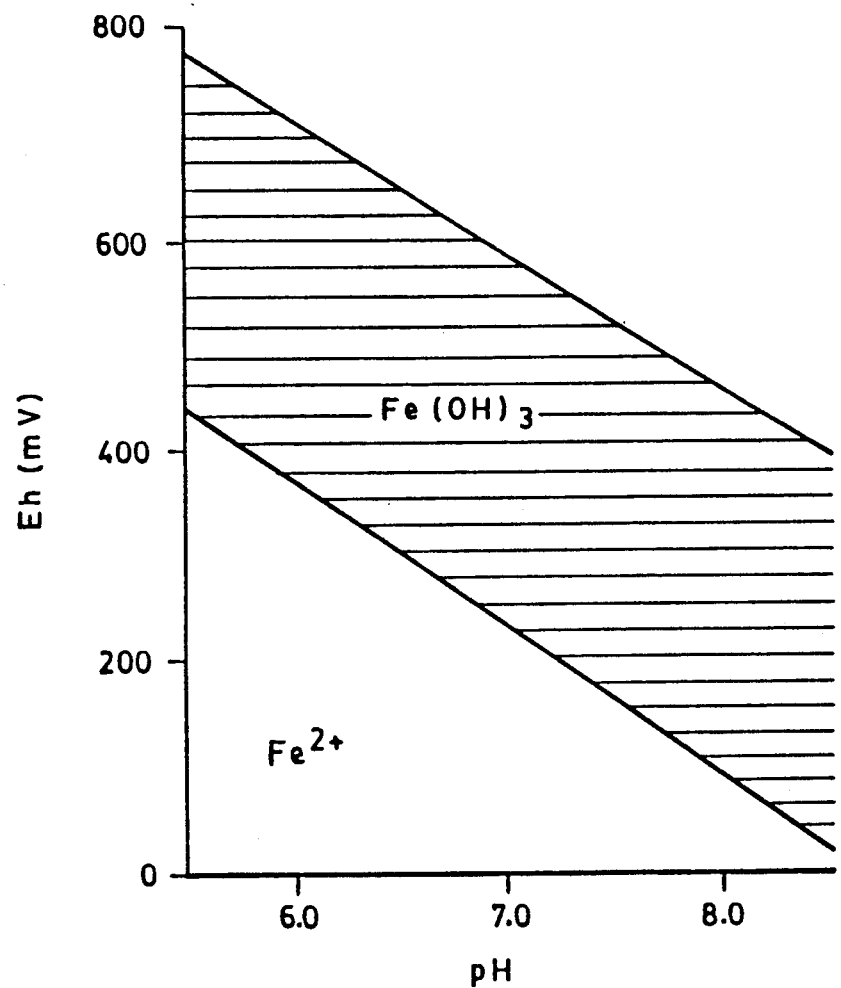
FIG. 6 is a graph illustrating soluble ($Fe^{2+}$) and insoluble [$Fe(OH)_3$] iron as function of pH and Eh.

Referring to FIG. 6 of the drawings, this figure is based on an illustration in the text by James I. Drever entitled "The Geochemistry of Natural Waters" published in 1982. The graph illustrates the existence of soluble ($Fe^{2+}$) and insoluble [$Fe(OH)_3$] iron at certain pH levels and as a function of Eh. Eh symbolizes voltage change taking place during the reaction. The graph indicates that in the lower left hand area, iron is soluble. When the level of redox potential and pH is within the shaded portion of the graph, the iron content precipitates as it is then insoluble. The aerial oxidation can be expressed in redox mode as follows:

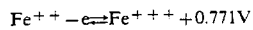

As the graph indicates, at lower pH levels iron is soluble. Thus, the presence of calcium carbonate to raise the pH level to pH 7 is helpful in the present method for removing iron from well water.

Testing has shown that the solubility of iron is indirectly proportional to pH and also to the degree to which the iron is oxidized. A paper presented by Mr. David F. Edson, P. E., at the 46th Annual Water Conference in Pittsburg, Pa., U.S., in November 1985 (Paper No. 53) indicates that aerial oxidation is a means of elevating the redox potential. The preferred apparatus described herein is therefore helpful in removing iron from well water in that it can both raise pH (by the use of calcium carbonate) and oxidize iron from a ferrous to ferric state, resulting in at least a significant portion of the dissolved iron in the water becoming particulate and insoluble.

Figure 5:
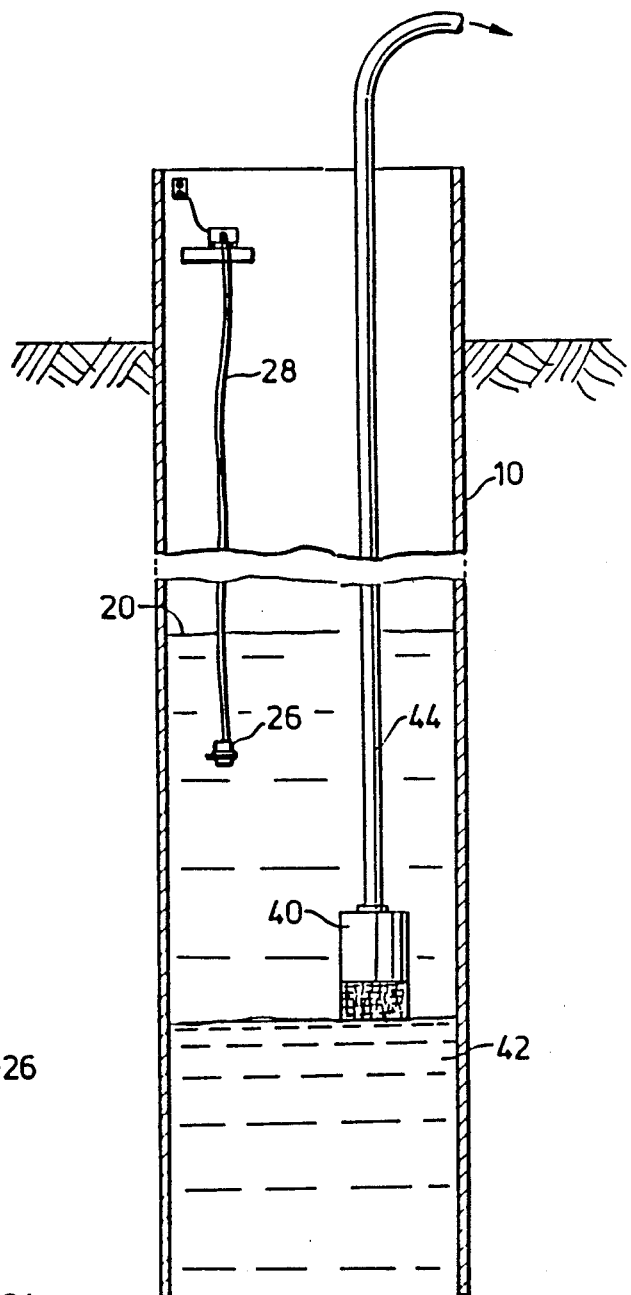
FIG. 5 is a schematic illustration showing an alternative method of removing precipitated iron from a well-.

Once the iron has been rendered insoluble so that it precipitates out, it should be removed from the well although this need not be done frequently or on a continuous basis. There are several possible ways for removing the precipitated iron from a water well. For example, in an older well, particularly one that is not very deep and has a diameter of three to four feet, a portable submersible pump such as the pump 40 illustrated in FIG. 5 can be used to periodically clean the bottom 42 of the well. The pump 40, which would normally be electrically operated, is used to pump bottom water together with precipitated iron through a flexible hose 44 up and out of the well to a suitable disposal site. In a narrower well, a submersible pump can also be used to periodically clean the bottom provided there is sufficient room in the well to raise and lower the pump as required.

An alternative method for removing precipitated iron from well water is illustrated in FIG. 1 and this includes the use of an iron collecting device 46 that is positioned around the bubbling device 26. The device 46 is removable from the well in order to remove and dispose of collected insoluble iron precipitate. Removal can be effected by means of a flexible line 48 extending up to the ground surface. The top of this line 48 can be connected to a fixed ring 50 connected to the inside of the well casing 10.

A preferred form of iron collecting device will now be described with reference to FIG. 2 of the drawings. The preferred device is a bag made of flexible fabric 52. This bag has a closed bottom end 54, a porous upper portion 56 and a substantially less porous lower portion 58. The illustrated bag is made from a synthetic material and has an open top 60 through which the tubing 28 for the bubbler can extend. In one preferred embodiment, the lower portion is made from polyester material having at least 128 threads per inch, sufficient to capture the precipitated iron that forms in the bag. The lower portion extends up the bag approximately one third of its height with the porous upper portion taking up the remaining two thirds. The cloth that forms the upper portion must be quite porous to permit the flow of water quite freely into and out of the bag. A suitable material for this purpose is 210 nylon rated at 3.2 ounces per square yard. Of course, instead of nylon, one can also use a polyester fabric for the upper portion. In one version of the collecting device 46, there are two layers of fabric material forming the lower portion 58 in order to capture the precipitated iron. The use of two layers may be desirable if the iron is in a very fine precipitate. The bag or sock can have a diameter of about six inches, a size suitable for insertion in many water wells.

It will be appreciated that because of the porous nature of the upper section, water containing dissolved iron can freely diffuse or otherwise circulate into the bag, this process being helped by the mixing action of the bubbling device 26. After precipitation of the iron in the bag, the iron-free water is then free to diffuse or circulate out of the bag, thereby making the water in the well progressively lower in iron content.

After a suitable period of time, the collecting device 46 is removed from the well and either replaced with a new device or cleaned for reuse. In order to clean the bag, it is turned inside out and washed and scrubbed in a suitable manner to remove the iron precipitate.

An important factor in deciding which iron removal method should be used in a particular well is the position of the main pump's foot valve. There must be enough space below the foot valve to accommodate a temporary build-up of iron precipitate if the pump-out system is to be used.

Figure 2:
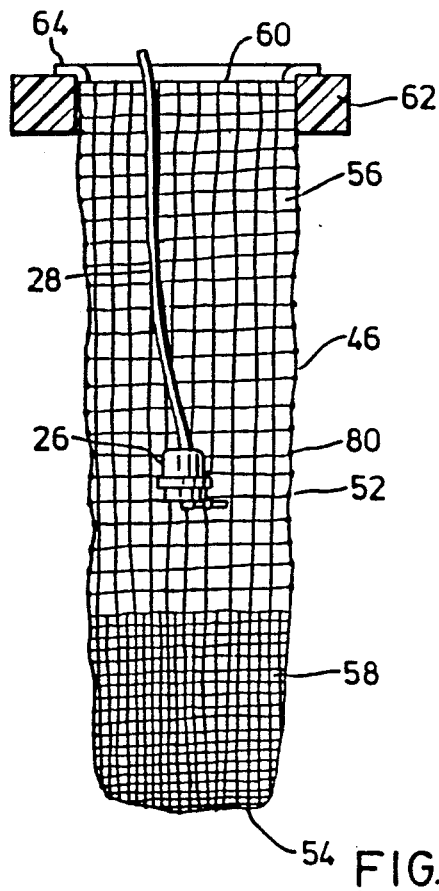
FIG. 2 is a detail view in vertical cross-section of an apparatus for removing iron from ground water embodying the present invention.

In the embodiment of FIG. 2, the collecting bag 48 has a floatation device 62 connected to its upper end so that the top of the bag is kept above or at the waterline 20 in the well. The preferred position of the top is at least two inches above the waterline. The use of this floatation device 62 is shown in FIG. 1 of the drawings. The device can be in the form of a ring or collar made of wood, styrofoam or other suitable light weight material that floats on water. The upper end of the bag should be attached in a secure manner to the device 62 such as by adhesive or non-rusting fasteners. In the embodiment shown in FIG. 2, a plastic ring 64 is secured to the top of the device 62 so that the bag material is sandwiched between the ring 64 and the device 62 and is thus held securely. As indicated in FIG. 1, the line 48 can be attached to a ring 66 connected to the floatation device 62, if desired. With the use of the floatation device 62, the iron collecting device 46 is always maintained in the water in the well even if the water level should fall considerably. To ensure that the floatation device floats on the water surface, the line 48 must be sufficiently long to permit the floatation device to drop if the water level drops.

The bubbling device 26 should have sufficient weight that it maintains itself below the waterline in the well at an appropriate position such as that shown in FIG. 2. The provision of sufficient calcium carbonate in the bubbler and two outlets (one of them allowing water inside) gives the bubbler the necessary weight.

If an iron collecting device such as the bag 46 is not used and instead the well is pumped out periodically, this should not be undue additional work for the well user. Wells with an iron content problem should in any event be pumped out periodically whether or not the present invention is employed. With the use of the present bubbling device, the pumping out step may simply be carried out more often. According to information available to the applicant, most states in the United States and provinces in Canada set an upper limit for iron content in a well of 0.3 mg/L. As indicated already, the presence of iron in well water can cause a number of problems including deposits in piping and appliances, formation of yellow-to-brown stains, and objectionable taste. Another problem arising from high iron content is an interference with ultra-violet light sometimes used to kill bacteria. If ultra-violet light is being used for sterilization in association with a water system having a high content of iron, the sterilization may not be as effective. The present method and apparatus for removing iron from ground water helps to alleviate in an inexpensive manner these known problems.

TEST RESULTS

The present method for removing iron from ground water has been tested in two wells. Prior to oxidation in the well using the present bubbling device, the well water was tested and found to have 7 mg/L iron, a pH of 7, a hardness of 47 mg/L, a sulphate content of 41 mg/L and a chloride content of 0.6 mg/L. This water was oxidized during one test run without the presence of calcium carbonate. After this test run the water was tested again and found to have only 1.3 mg/L iron, a pH level of 6.3, a hardness of 43 mg/L, a sulphate content of 36 mg/L and a chloride content of 0.7.

A test was also run on the same well with a suitable amount of calcium carbonate in the bubbling device. The water in the well was tested again and found to contain only 0.8 mg/L iron at a pH level of 6.9. The hardness of this test water was 52 mg/L and the water contained 37 mg/L sulphate and 0.7 mg/L chloride. The iron content in the water was in each case determined by atomic absorption spectro-photometer. The chloride content was determined by selective ion electrode method while the sulphate content was determined gravimetrically. The present invention was also tested in a second well that prior to oxidation using a bubbling device contained 2.4 mg/L iron and had a pH level of 6.6. After oxidation using the method of the present invention and without the presence of calcium carbonate ($CaCO_3$) the well water contained 0.4 mg/L iron and had a pH level of 6.3. A further test was conducted using calcium carbonate in the well water and the level of iron measured after oxidation was only 0.2 mg/L with a pH level of 6.8.

It has been discovered that the bubbling device disclosed herein is also highly advantageous in a water ell having water with sulphur containing compounds. If a water well contains both such compounds and dissolved iron, the air stream produced by the bubbler can and will have a double action.

It is well known that many water wells are rendered undesirable because of the presence of sulphur containing compounds in the water. Sulphur containing well waters smell of hydrogen sulphide which is produced by the action of anaerobic bacteria on sulphur containing compounds and materials. Hydrogen sulphide gas has a very unpleasant smell and therefore the well water can be unpleasant or impossible to drink or use. It has now been discovered that keeping a steady stream of air bubbles through the water will change the anaerobic conditions into aerobic and, in the latter condition, no reduction takes place and no hydrogen sulphide is produced. In addition, the air stream displaces other gases from the water by a process known as air stripping. This air stripping plus oxidizing conditions in the well eliminate the sulphur problem and this is true even in wells that contain no dissolved iron.

Where the presence of sulphur is a concern in the well water, the air flow produced by the bubbling device is preferably higher than in the case where only iron is being removed. The bubbling device should be positioned as close to the bottom of the well as possible in order to have maximum air contact (subject to the provision that the settled material at the bottom of the well should not be disrupted). A stronger air pump (compared to one used to remove iron only) is recommended for this purpose.

TEST RESULTS ON SULPHER CONTAINING WELL WATER

The above described method was tested on a well located in Southern Ontario, Canada, which well had consistently containing about 0.8 mg/liter sulphide ion. The odor of the well water was considered offensive. After three weeks of bubbling treatment, the well water improved. A test sample of the treated well water did not smell of $H_2S$ and no sulphide ion was detected.

Modifications and changes to the described method and apparatus would be obvious to one skilled in this art after considering the present disclosure and drawings. All such modifications and changes are intended to be part of this invention. It will be clear that the present invention can take various forms and configurations, the particular one chosen depending on the size of the unit required, the amount of iron present in the water, and other water and well conditions.

I therefore claim:

1. Apparatus for removing iron from ground water in a water well comprising:
   a bubbling device constructed and arranged for placement in said water well,
   line means for connecting said bubbling device to a source of pressurized air which is substantially ozone free for aerial oxidation of the water to render insoluble said iron, and
   a removable iron collecting device mounted around said bubbling device for collecting said insoluble iron.

2. Apparatus for removing iron from ground water according to claim 1 including a lump of calcium carbonate located in said bubbling device so as to contact water passing through said bubbling device.

3. Apparatus for removing iron from ground water according to claim 1 including an air pump connected to said line means.

4. A method of removing iron from ground water located in a water well comprising positioning a bubbling device in said well below the water line, said bubbling device being connected to a source of pressurized air, positioning an iron collecting device around said bubbling device, operating said bubbling device to produce a continuous flow of air bubbles in the water to render dissolved iron in the water insoluble so that the dissolved iron precipitates out, and gathering the insoluble iron from said well periodically, wherein the insoluble iron precipitate is gathered and disposed of by removing said iron collecting device from said well.

5. A method according to claim 4 including exposing the water in said well to crushed calcium carbonate located in said bubbling device in order to adjust the pH level to pH 7.

6. A method according to claim 4 wherein said collecting device is a bag made of flexible fabric and having a closed bottom end, said bag having a porous upper portion and a substantially less porous lower portion.

7. A method according to claim 6 wherein said bag is made of polyester and has an open top located above the waterline in said well.

8. A method according to claim 6 wherein said lower portion of said bag is made from synthetic material having at least 128 threads per inch.

9. A method according to claim 6 wherein said upper portion extends over about two-thirds of the height of said bag and said lower portion extends over the remainder of said bag.

10. A method according to claim 6 wherein said bag has a diameter of at least six inches.

11. A method according to claim 6 wherein said bag is fastened to an end of a flexible line extending up to the ground surface, said line facilitating removal of said bag from said well.

12. A method according to claim 6 wherein said bag has a flotation device connected to its upper end so that the top of said bag is kept above or at said waterline in said well.

13. Apparatus for removing iron from ground water located in a water well comprising:
    a bubbling device constructed and arranged for placement in said water well,
    line means for connecting said bubbling device to a source of pressurized air, and
    a removable iron collecting device mounted around said bubbling device in said water well, said collecting device being a bag made of flexible synthetic fabric and having a closed bottom.

14. Apparatus for removing iron from ground water according to claim 13 wherein said bag has a porous upper portion permitting water to flow through it and a substantially less porous lower portion capable of collecting precipitated iron.

15. Apparatus for removing iron from ground water according to claim 14 wherein said bag has a floatation device connected to its top end whereby the top of said bag is maintained above the waterline of said well during use thereof.

16. Apparatus for removing iron from ground water according to claim 14 including a flexible line connected to a top end of said bag in order to provide means for retrieving said bag from said well.

17. Apparatus for removing iron from ground water according to claim 13 wherein said bag has a porous upper portion comprising 210 nylon with a material weight of about 3.2 ounces per square yard and a substantially less porous lower portion capable of collecting precipitated iron.

18. A method of improving ground water located in a water well comprising positioning a bubbling device in said well below the waterline, said device being connected to a source of pressurized air, and operating said bubbling device to produce a continuous flow of air bubbles in the water wherein either dissolved iron in the water is rendered insoluble by aerial oxidation so that the dissolved iron precipitates out or the production of hydrogen sulphide due to the presence of one or more sulphur containing compound is prevented by aerial oxidation; wherein,
    an iron collecting device is positioned around said bubbling device, said iron collecting device being removable from said well in order to remove and dispose of collected insoluble iron precipitate.

* * * * *